US010632646B2

(12) United States Patent
van der Horst et al.

(10) Patent No.: US 10,632,646 B2
(45) Date of Patent: Apr. 28, 2020

(54) DEPOSITION OF CLAY STRUCTURES

(71) Applicant: IHC Holland IE B.V., Sliedrecht (NL)

(72) Inventors: Arjen van der Horst, Delft (NL); Adrianus Josephus Petrus Marie Koevoets, Klein Zundert (NL)

(73) Assignee: IHC Holland IE B.V., Sliedrecht (NL)

( * ) Notice: Subject to any disclaimer, the term of this patent is extended or adjusted under 35 U.S.C. 154(b) by 383 days.

(21) Appl. No.: 15/504,021

(22) PCT Filed: Aug. 13, 2015

(86) PCT No.: PCT/NL2015/050576
§ 371 (c)(1),
(2) Date: Feb. 15, 2017

(87) PCT Pub. No.: WO2016/024863
PCT Pub. Date: Feb. 18, 2016

(65) Prior Publication Data
US 2017/0232638 A1  Aug. 17, 2017

(30) Foreign Application Priority Data
Aug. 15, 2014  (NL) ..................................... 2013331

(51) Int. Cl.
*B28B 1/00* (2006.01)
*B33Y 70/00* (2020.01)
(Continued)

(52) U.S. Cl.
CPC .......... *B28B 1/001* (2013.01); *B28B 17/0081* (2013.01); *B29C 64/106* (2017.08);
(Continued)

(58) Field of Classification Search
CPC ....... B28B 1/001; B28B 1/01; B28B 17/0081; B33Y 10/00; B33Y 30/00; B33Y 40/00; B33Y 50/02; B33Y 70/00; B33Y 99/00; B29C 64/106; B29C 64/10; B29C 64/141; B29C 64/153; B29C 64/165; B29C 64/171; B29C 64/20; B29C 64/205; B29C 64/209; B29C 64/245; B29C 64/25; B29C 64/264; B29C 64/268; B29C 64/273;
(Continued)

(56) References Cited

U.S. PATENT DOCUMENTS 2,587,835 A * 3/1952 Goodman ............... E02D 23/06
405/10
3,515,684 A * 6/1970 McEvoy .................. B01J 37/00
502/8
(Continued)

FOREIGN PATENT DOCUMENTS

EP  1886793 A1 *  2/2008  ........... B29C 64/112
EP  1886793 A1   2/2008
(Continued)

*Primary Examiner* — Joseph S Del Sole
*Assistant Examiner* — Jamel M Nelson
(74) *Attorney, Agent, or Firm* — N.V. Nederlandsch Octrooibureau; Catherine A. Shultz; Katelyn J. Bernier

(57) ABSTRACT

A method of printing includes mixing a clay mixture with an alkaline agent to form a printable mixture; forming pellets from the printable mixture; ejecting the pellets from a print head onto a printing surface; and curing the pellets.

17 Claims, 2 Drawing Sheets

(51) Int. Cl.
  *C04B 28/00* (2006.01)
  *B29C 64/106* (2017.01)
  *B33Y 10/00* (2015.01)
  *B33Y 30/00* (2015.01)
  *B33Y 40/00* (2020.01)
  *B33Y 50/02* (2015.01)
  *B28B 17/00* (2006.01)
  *C04B 111/74* (2006.01)
  *C04B 111/00* (2006.01)

(52) U.S. Cl.
  CPC ............... *B33Y 10/00* (2014.12); *B33Y 30/00* (2014.12); *B33Y 40/00* (2014.12); *B33Y 50/02* (2014.12); *B33Y 70/00* (2014.12); *C04B 28/006* (2013.01); *C04B 2111/00181* (2013.01); *C04B 2111/74* (2013.01); *Y02P 40/165* (2015.11); *Y02W 30/91* (2015.05); *Y02W 30/92* (2015.05)

(58) Field of Classification Search
  CPC . B29C 64/295; B29C 64/371; C04B 2111/74; C04B 2111/00181; C04B 28/006; C04B 18/08; C04B 18/0436; Y02W 30/91; Y02W 30/92; Y02P 40/165
  See application file for complete search history.

(56) References Cited

U.S. PATENT DOCUMENTS

| | | | |
|---|---|---|---|
| 6,528,800 B1* | 3/2003 | Dzwierzynski | G21K 5/02 250/428 |
| 2005/0077644 A1* | 4/2005 | Bryan | B26F 3/004 264/143 |
| 2011/0020202 A1* | 1/2011 | Gadkaree | B01J 20/02 423/215.5 |

FOREIGN PATENT DOCUMENTS

| | | | |
|---|---|---|---|
| EP | 2301683 A2 * | 3/2011 | ............... B03B 9/04 |
| EP | 2301683 A2 | 3/2011 | |
| WO | 2007126215 A1 | 11/2007 | |

* cited by examiner

DEPOSITION OF CLAY STRUCTURES

Three-dimensional printing, or additive manufacturing forms three-dimensional objects from a digital model. The object is formed by successively forming layers of the object, typically with a polymer. However, other materials, such as metals, rubber, clay, cement, plaster and even paper can be used in additive manufacturing. When clay or cement is used in additive manufacturing, it is typically extruded in a line to form a layer.

In the formation of subsea structures, different methods of building are typically used depending on the structure desired. In large land reclamation operations, aggregates are dredged, transported to a new location and then piled by dumping or other means to form the new land. The volume, stability and erosion properties of the newly built land is subject to the size and density of the applied mass forming the new land. The size of the reclaimed land is approximately equal to the applied mass of dredged aggregates, and therefore also proportional to the capacity of the transport which the dredged aggregates travel to the reclamation site.

For more precise subsea structures, a variety of methods can be used. For example, large basalt and/or concrete blocks can be made and positioned to form a subsea wall or coastal protection barriers. Thus, the stability and precision of the structure are high, though it can be difficult and costly to produce, transport and lay out the large blocks. Other subsea structures require temporary dam wall constructions or other methods to hold back the water while constructing the desired structure. Thus, these types of techniques require intensive preparation with extensive financial investments.

SUMMARY

A method of printing includes mixing a clay mixture with an alkaline agent to form a printable mixture; forming pellets from the printable mixture; ejecting the pellets from a print head onto a printing surface; and curing the pellets.

This method allows for the printing of precise and sometimes complex structures from a clay mixture that will cure into a rigid and stable structure.

According to an embodiment, the printing surface is subsea.

According to an embodiment, the method includes forming a sealed environment around the printing surface.

According to an embodiment, the step of forming a sealed environment comprises injecting steam and/or compressed air to form a steam or compressed air bubble around a portion of the print head and the printing surface.

According to an embodiment, the method further comprises using a laser to apply curing heat for the printed pellet.

According to an embodiment, a source used to form the sealed environment provides heat for curing.

According to an embodiment, the method further comprises storing pellets.

According to an embodiment, the step of forming pellets comprises extruding the printable mixture.

According to an embodiment, the step of forming pellets further comprises cutting the extruded mixture into pellets.

According to an embodiment, the mixture is cut into pellets with a water jet.

According to an embodiment, the method further comprises supplying a printable mixture to the print head from one or more cartridges.

According to an embodiment, the method further comprises analyzing dredged components; mixing dredged components with geopolymer components and/or water; and supplying the printable mixture to the one or more cartridges.

According to an embodiment, the method further comprises moving the print head to eject pellets in a different location.

According to another aspect of the invention, a printer comprises means for mixing clay with an alkaline agent to form a printable mixture; and a print head to form the printable mixture into pellets and to direct the pellets toward a printing surface.

This printer enables the accurate and precise printing of complex objects or structures from a clay mixture through the ability to form and eject pellets. The pellets are then able to deform and bond with the printing surface to form the objects or structures.

According to an embodiment, the printer further comprises a heat source to direct at the printing surface for curing. Optionally, the heat source could be steam and/or a laser.

According to an embodiment, the printer further comprises one or more cartridges for providing the printable mixture to the print head.

According to an embodiment, the printer further comprises a cutting system in the print head to form the pellets for ejection.

According to an embodiment, the cutting system comprises a water jet.

According to an embodiment, the printer further comprises a frame for containing the printer.

According to an embodiment, the printer further comprises a motion control system for controlling the motion and direction of the print head.

According to an embodiment, the printing surface is a subsea surface.

According to an embodiment, the printer further comprises a sealing system to form a sealed environment around at least a portion of the print head and the printing surface.

According to an embodiment, the sealing system comprises a compressed air and/or steam delivery system directed at the printing surface According to an embodiment, the printer further comprises one or more additional print heads to form the printable mixture into pellets and to direct the pellets toward a printing surface.

According to an embodiment, the printer further comprises a feeder line for providing the printable mixture to the print head.

DETAILED DESCRIPTION

Figure 1:
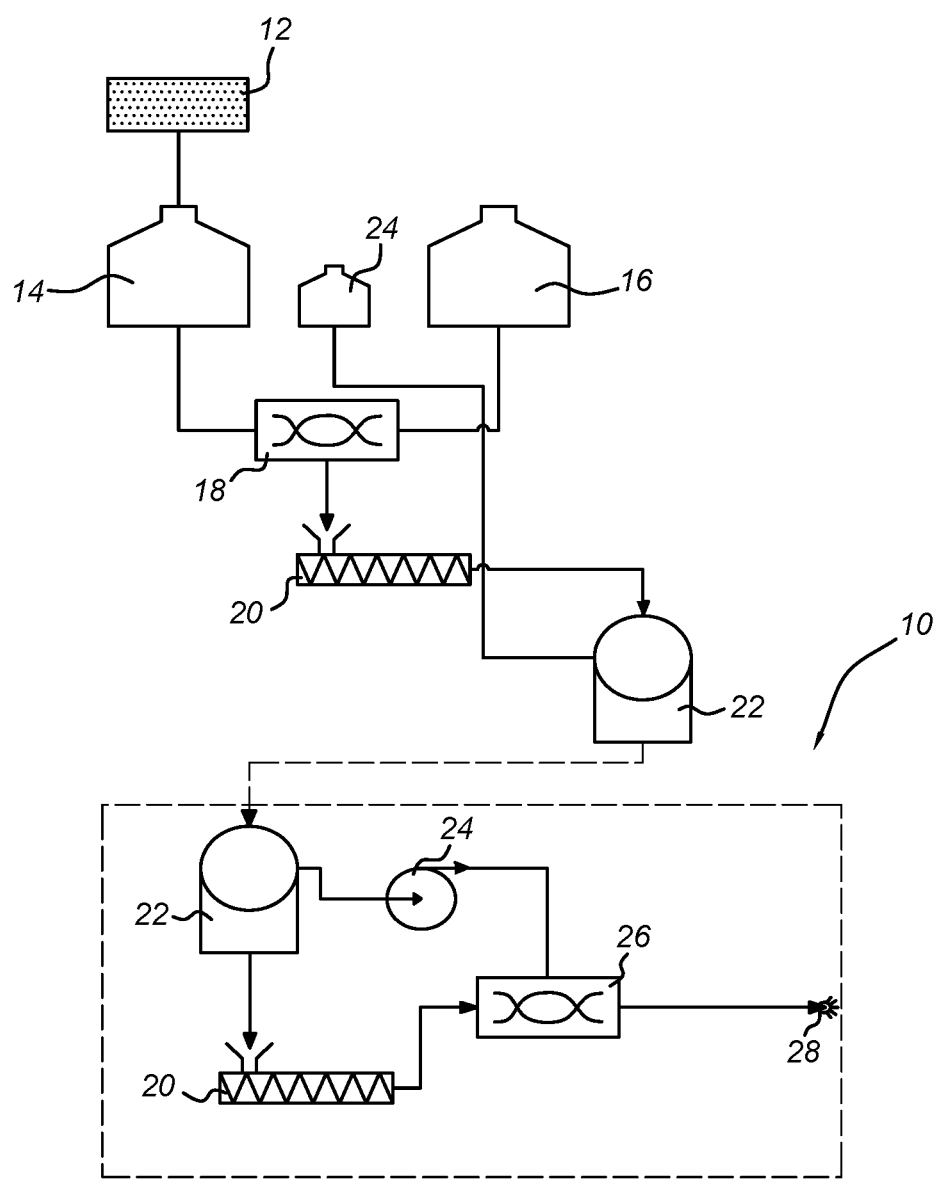
FIG. 1 schematically shows a deposition system.

FIG. 1 schematically shows a deposition process from dredging the materials to be used by deposition system 10 to forming an object or structure. Structures can include a simple garden wall to building supports or even full buildings. Structures can also include subsea structures, such as a costal barrier, quay structures, inspection channels, mooring points and even subsea building supports and/or buildings.

The process can start from the dredging of clay, schematically depicted by 12. Dredging can be done with a vessel for dredging, for example a cutter-suction dredger, or through other means known in the art. The clay can then be stored in storage container 14 and analyzed to determine the content of the local dredged components. While it is said that clay is the material dredged, this is inclusive of dredged material that is a mixture of clay and other materials.

Next, geopolymer components 16 can be prepared based on the content of the locally dredged components. An example of a suitable geopolymer component is an alkaline agent, such as fly ash. The mixture of an alkaline agent such as fly ash with a clay mixture can form a printable mixture that can cure into a very rigid, rock-like structure that can be very resistant to corrosion and temperature changes. The geopolymer components 16 and the dredged components 14 can be mixed in blender 18, which can be situated on transport vessel 20 for transporting the mixture to another location. The mixture can then be put into cartridges 22 for deposition system 10.

Deposition system 10 is schematically depicted as one or more cartridges 22, accelerator 24, blender 26, air and/or heat source 27 (see FIG. 2) and a print head 28. Deposition system 10 can also include some sort of transport vessel 20 for taking deposition system 10 to a desired location. Deposition system 10 can be contained on a transportable frame (not shown) and can include a print head motion controller, a control system, and/or a print head and dynamic print head suspension system. The transportable frame can be transportable by different means, for example, suspension by a crane or on wheels. While transport vessel 20 is shown as a ship in this embodiment, it could be a land transport vehicle, for example a truck or a train.

In operation, deposition system 10 can be taken to a desired location for building a structure by vessel 20 or by other transport means. Transportable frame can then be placed or suspended near the area where the printing is desired, and controller systems can act to place print head 28 directly adjacent to where printing is to start. The clay mixture in cartridge 22 is then mixed with accelerator 24 in the blender 26. In embodiments where deposition system 10 is printing subsea, a steam or air source 27 can first form a sealed environment where print head 28 is directed. Then print head 28 ejects a pellet onto the subsea surface in this sealed environment. When not printing subsea, a sealed environment is not typically needed and print head 28 can begin printing by ejecting a pellet once it is properly positioned and aligned. Air and/or heat source 27 can be used in land operations to promote curing.

Due to the clay mixture used and the ejection speed from print head 28, the clay pellet deforms to bind to the other particles on print surface 38. The pellet quickly cures, and print head 28 and air/heat source 27 are moved by control system to eject a pellet and possibly form a sealed environment in another location, often adjacent to the first pellet. Print head 28 continues this process, with control system controlling the movement of print head 28 to build the desired structure pellet by pellet and layer by layer.

Deposition system 10 is able to eject individual pellets at precise locations, building a structure layer by layer. The buildup by pellets ejected by deposition system 10 enables the building of very complicated structures that may have been very difficult or impossible to build with past methods, especially on subsea surfaces. The small pellets allow for high resolution printing, giving deposition system the ability to create very complex structures with precise surfaces and high quality. Examples of such structures can be anything from a small garden or pond walls to undersea tunnels to buildings.

Figure 2:
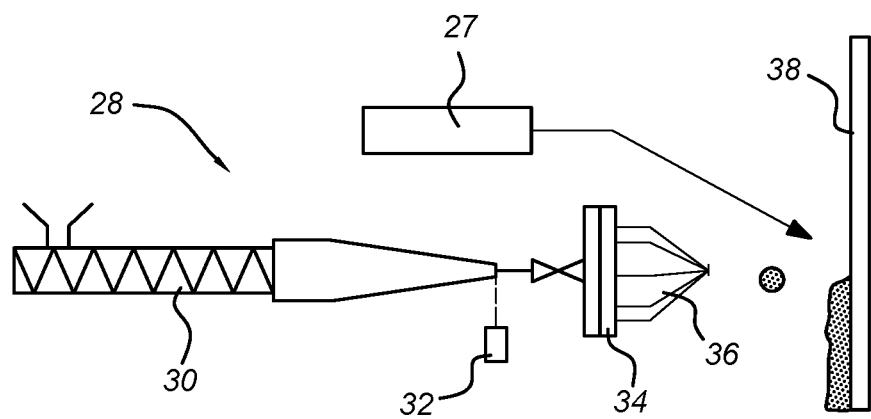
FIG. 2 schematically shows a print head of the deposition system.

FIG. 2 schematically shows print head 28 and air/heat source 27 of deposition system 10 ejecting pellets onto printing surface 38. Print head 28 includes feeder 30, cutter 32, collection bin 34, and ejection tubes 36.

Feeder 30 receives the clay mixture from cartridge 22. At this point, clay mixture has been mixed with accelerant, so it is ready for printing. The clay mixture is then extruded from feeder 30, where it is cut into pellets by cutter 32.

Cutter 32 can be, for example, a water jet or a plane of water to enable easy cutting of the clay mixture. Alternative cutters 32 could include a blade or other device to cut the extruded clay mixture into small pellets. These pellets could vary in size depending on the size of printer head 28, the required print speed, required volume flow or other system or structure requirements, and could be, for example, 0.04 $mm^3$ to 4 $mm^3$.

Pellets can then be collected in collection bin 34, before they are ejected through tubes 36. Pellets are propelled through ejection tubes 36 toward the printing surface 38 using compressed air and/or another gas. Because pellets are a clay mixture, they deform and bond with printing surface 38 upon contact. Thus, they are able to form precise and complex mechanical shapes due to the bonding surface between each pellet.

Air/Heat source 27 can be used to provide heat for curing pellets and/or to provide a sealed environment in the case of subsea deposition. In the case of providing a sealed environment, heat such as steam could be used or compressed air could be used when less or no heat is needed. In addition, a laser or other heat source can be used in addition to or in alternative to air/heat source 27 to further initiate and promote curing of the pellets on printing surface 38. Curing must occur when the clay pellet hits printing surface 38. The addition of heat once pellet has contacted printing surface 38 can ignite the curing process.

Figure 3:
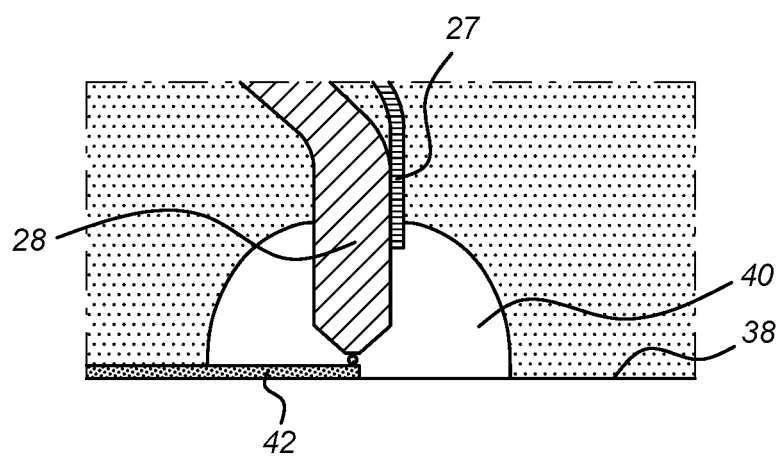
FIG. 3 schematically shows a side view of the print head while printing onto a subsea surface.

FIG. 3 schematically shows a side view of the print head 28 and air/heat source 27 while printing onto a subsea printing surface 38, and includes sealed environment 40 and printed pellets 42.

In this embodiment, air/heat source 27 is a pipe connected to print head 28. Air/heat source 27 delivers steam to be used for sealing the printing environment and as a heat source for curing. In other embodiments where a heat source is not needed for curing, pipe 27 could simply deliver compressed air to form sealed environment 40. The steam for steam pipe 27 could be generated at the print head or onboard vessel 20, for example, using heat from an engine. Other embodiments may include one or more other heat sources in addition to or in alternative to steam, for example a laser or plasma jet. In other embodiments, pipe 27 and/or another heat source may not be directly connected to print head 28.

Steam is fed out of air/heat source 27, which in this embodiment directs the steam toward printing surface 38 to form a sealed printing environment 40 at the exit of print head 28 and around the printing surface 38 at which pellet is directed. Once sealed environment 40 is formed, pellets can be ejected from print head 28 onto printing surface 38. As clay is a very ductile material, when it contacts printing surface 38, the clay pellets deform to bond to and join the printed structure 42. Thus, the clay pellets are transformed into a stable rigid structure.

In the embodiment shown, the steam used for forming sealed environment 40 also provides the heat needed for curing the deposited clay particles. Sealed environment 40 protects the exit of print head 28 and printing surface 38 to allow for the proper bonding and curing of pellets to the structure.

In summary, deposition system 10, through the use of a clay mixture and printer head 28 to form and eject pellets allows for the precise printing of complex structures. In addition, deposition system 10 can allow for printing of subsea structures through the use of steam and/or compressed air to form a sealed environment 40 around the exit of print head 28 and printing surface 38 for printing and curing of pellets.

As mentioned above, past additive manufacturing systems which used clay or concrete typically extruded the clay or concrete in a line to build a layer of the object or structure. Deposition system 10 forms and ejects small pellets to build the object or structure, resulting in a process able to build more precise and complex objects and structures.

Past subsea systems typically either dammed and drained the area in which the forming of the structure was to take place or relied on heavy concrete blocks which were sunk to form the subsea structure. Deposition system 10 does not require damming and draining for printing due to the use of steam source or compressed air to provide sealed environment 40 and any needed heat for the printing and curing of pellets. This can save greatly in time and costs for subsea structures. Additionally, the building of the subsea structure through printed pellets results in more uniform properties throughout the structure as compared to the stacking of concrete blocks or other materials.

The production of fairly small pellets from a clay mixture and a precise control system to direct these pellets at a printing surface 38 gives deposition system 10 the ability to print complex shapes and objects that were very difficult or impossible to form through other methods. For example, deposition system 10 could be used to build porous structures, quay structures, inspection channels, mooring points and even complete buildings.

While deposition system 10 is depicted in FIGS. 1-3 as one print head 28 being fed by a cartridge 22, deposition system 10 could consist of a plurality of print heads and/or another feeder system such as a feed line from a transport vessel. The use of more than one print head 28 and/or a feeder line could be especially useful when forming a large structure. The plurality of print heads 28 could be moved in unison or could be moved separately by the control system.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

The invention claimed is:

1. A method of printing on a subsea printing surface, the method comprising:
   mixing a clay mixture with an alkaline agent to form a printable mixture;
   forming pellets from the printable mixture;
   forming a sealed environment comprising a steam and/or compressed air bubble around at least a portion of a print head and the subsea printing surface;
   ejecting the pellets from the print head directly onto the subsea printing surface to form a printed structure; and
   curing the printed structure with a heat source comprising steam or a laser within the sealed environment.

2. The method of claim 1, wherein the step of forming the sealed environment comprises:
   injecting steam and/or compressed air to form the steam and/or compressed air bubble around at least a portion of the print head and the subsea printing surface.

3. The method of any of claim 1, wherein the step of curing the printed structure comprises using a laser to apply curing heat for the printed structure.

4. The method of claim 1, wherein the heat source used in the step of curing is also used in the step of forming the sealed environment.

5. The method of claim 1, and further comprising:
   storing the pellets.

6. The method of claim 1, wherein the step of forming pellets comprises extruding the printable mixture.

7. The method of claim 6, wherein the step of forming pellets further comprises:
   cutting the extruded printable mixture into pellets.

8. The method of claim 7, wherein the extruded printable mixture is cut into pellets with a water jet.

9. The method of claim 1, and further comprising:
   supplying the pellets to the print head from one or more cartridges.

10. The method of claim 9, and further comprising:
    analyzing dredged components;
    mixing the dredged components with geopolymer components and/or water; and
    supplying the pellets to the one or more cartridges.

11. The method of claim 1, and further comprising:
    moving the print head to eject the pellets in a different location.

12. A printer comprising:
    means for mixing clay with an alkaline agent to form a printable mixture;
    a print head to form the printable mixture into pellets and to eject the pellets directly onto a subsea printing surface to form a printed structure;
    a sealing system for forming a sealed environment comprising a steam and/or compressed air bubble around at least a portion of the print head and the subsea printing surface; and
    a heat source comprising steam or a laser for curing the pellets within the sealed environment.

13. The printer of claim 12, and further comprising:
    one or more cartridges for providing the printable mixture to the print head.

14. The printer of claim 12, and further comprising a cutting system in the print head to form the pellets for ejection.

15. The printer of claim 14, wherein the cutting system comprises a water jet.

16. The printer of claim 12, and further comprising a motion control system for controlling the motion and direction of the print head.

17. The printer of claim 12, wherein the sealing system comprises a compressed air and/or steam delivery system directed at the subsea printing surface.

* * * * *